United States Patent
Jung

(10) Patent No.: US 9,762,696 B2
(45) Date of Patent: Sep. 12, 2017

(54) DATA STORAGE COMMUNICATION APPARATUS, AND DATA TRANSMISSION AND MANAGEMENT METHODS USING THE SAME

(75) Inventor: Sangsu Jung, Jinhae-si (KR)

(73) Assignee: INSTITUTE FOR BASIC SCIENCE, Daejeon (KR)

( * ) Notice: Subject to any disclaimer, the term of this patent is extended or adjusted under 35 U.S.C. 154(b) by 1096 days.

(21) Appl. No.: 13/484,971

(22) Filed: May 31, 2012

(65) Prior Publication Data

US 2013/0297742 A1    Nov. 7, 2013

(30) Foreign Application Priority Data

May 4, 2012    (KR) .................. 10-2012-0047283

(51) Int. Cl.
   *G06F 15/16*    (2006.01)
   *H04L 29/08*    (2006.01)

(52) U.S. Cl.
   CPC ........ *H04L 67/325* (2013.01); *H04L 67/1097* (2013.01)

(58) Field of Classification Search
   None
   See application file for complete search history.

(56) References Cited

U.S. PATENT DOCUMENTS

| | | | |
|---|---|---|---|
| 5,666,337 A * | 9/1997 | Dang et al. | 369/30.66 |
| 2002/0083120 A1* | 6/2002 | Soltis | 709/200 |
| 2002/0131397 A1* | 9/2002 | Patel | H04W 48/10 370/349 |
| 2004/0249858 A1* | 12/2004 | Nakagawa et al. | 707/104.1 |
| 2006/0215641 A1* | 9/2006 | Kitagawa et al. | 370/352 |
| 2012/0005352 A1* | 1/2012 | Nitta | 709/227 |

FOREIGN PATENT DOCUMENTS

| | | |
|---|---|---|
| KR | 10-0957180 B1 | 5/2010 |
| KR | 10-0958519 B2 | 5/2010 |

* cited by examiner

*Primary Examiner* — Scott B Christensen
(74) *Attorney, Agent, or Firm* — Rabin & Berdo, P.C.

(57) ABSTRACT

Disclosed herein are a data storage communication apparatus, and data transmission and management methods using the same. The data storage communication apparatus includes a data request signal reception unit, a main control unit, massive storage, and a data transmission unit. The data request signal reception unit receives a data request signal from one of a plurality of user terminals. The main control unit analyzes the data request signal received by the data request signal reception unit, and determines whether data is present in the apparatus itself by searching the apparatus. The massive storage stores and manages a variety of types of data found by the main control unit. The data transmission unit transmits the data to the user terminal. The data is found in the storage by the main control unit.

17 Claims, 5 Drawing Sheets

FIG. 4

| Content | Content Size | Virtual Code | recent request time | request count | list of within-one-hop data storage communication apparatuses | list of within-two-hops data storage communication apparatuses | rank |
|---|---|---|---|---|---|---|---|
| AdEE | 1.2GB | c101 | 13:30:31 03/05/2012 | 52 | data storage communication apparatus a, data storage communication apparatus b | data storage communication apparatus c | 1 |
| KDJFD | 400MB | c102 | 13:21:22 03/05/2012 | 33 | data storage communication apparatus d, data storage communication apparatus e, data storage communication apparatus k | data storage communication apparatus r | 2 |
| QSGCX | 420MB | c104a | 09:50:12 03/04/2012 | 11 | data storage communication apparatus y, data storage communication apparatus z | data storage communication apparatus h, data storage communication apparatus n, data storage communication apparatus v | 3 |
| VFDSEXX | 600MB | cc230e | 11:05:00 03/03/2012 | 9 | data storage communication apparatus j | – | 4 |
| ⋮ | ⋮ | ⋮ | ⋮ | ⋮ | ⋮ | ⋮ | ⋮ |

DATA STORAGE COMMUNICATION APPARATUS, AND DATA TRANSMISSION AND MANAGEMENT METHODS USING THE SAME

BACKGROUND OF THE INVENTION

1. Field of the Invention

The present invention relates generally to a data storage communication apparatus and a data management method for the apparatus and, more particularly, to a data storage communication apparatus and a data management method for the apparatus, in which massive data storage, a data storage unit and internal interworking units are all mounted within a wireless router, thereby improving data processing rate and portability, in which the storage time is set by taking into consideration the request count and the request time for content, which are stored in the data storage device, and in which a series of data distribution, re-distribution and deletion methods using a wireless network are provided.

2. Description of the Related Art

In general, conventional data storage communication apparatuses are disadvantageous in that the content of storage cannot be rapidly transmitted over a communication network because the data storage of a wireless network system is installed and used outside a wireless access point, so that data processing speed and transmission efficiency are low. Furthermore, the conventional data storage communication apparatuses are problematic in that content having a low probability of being used or malicious content may be stored for a long time because a storage period is set to a period which is simply proportional to the frequency of use of stored content.

As a specific example, Korean Patent Application No. 10-2011-0119324 discloses a technology including a plurality of user terminals; a plurality of access points connected to the plurality of user terminals via a wireless connection; a plurality of content origin servers configured to provide content to the access points; and content storage configured to store content received from the content origin servers for each of the access points, and further including a negotiation protocol unit configured to, when a user terminal requests content, determine whether to participate in a transmission access point group which consists of access points selected from among the plurality of access points and which provides content to the corresponding user terminal. Thereafter, the user terminal receives the content from the access points which participate in the transmission access point group based on the determination of the negotiation protocol unit.

This technology has limitations to data processing efficiency, portability and the ease of installation because the data storage device is installed outside the wireless access points, and is problematic in that the performance of data transmission and storage may be deteriorated when a malicious user repeatedly requests unnecessary data because only the frequency of use of data is checked in order to manage data.

Furthermore, Korean Patent No. 10-0957180 discloses a technology including a plurality of program receiving devices and a switch. The plurality of program receiving devices operates in parallel in a receiver including an interface circuit for receiving data from a plurality of programs broadcast via a network connected to the receiver. Each of the receiving devices receives the data of at least one program, and the received programs are selected in compliance with preset criteria. The switch outputs the data of at least one program which is received by one of the plurality of program receiving devices.

This technology is a control signal transmission technology which is suitable for traffic characteristics when data is broadcast at high speed over a wireless mobile network or transmission is performed for each group. This technology focuses only on traffic characteristics, and does not take into consideration the efficiency of transmission of content. Therefore, this technology is problematic in that transmission efficiency is low.

Finally, Korean Patent No. 10-0958519 discloses a control signal transmission technology for a UMTS system, which is suitable for a wireless access network which broadcasts or multicasts data with variety of characteristics at high speed in a wireless mobile communication system. This technology provides a wireless system which broadcasts or multicasts a plurality of multimedia services. This system is configured such that information blocks are constructed for respective multimedia services provided by one cell, an information block for each service is transmitted to a terminal group who wants to receive the specific service, and the service information blocks provided by the cell are simultaneously transmitted to terminal groups in the cell via a specific common control channel.

This technology is a technology which is configured to automatically select one from multiple communication interfaces in conformity with a surrounding environment in order to support the communication of a mobile terminal which has the multiple communication interfaces. The core of this technology is the setting of an interface. This technology does not include a method of managing/transmitting data while taking into consideration data stored in a storage device inside a terminal device and a user's request, and therefore is insufficient in terms of data management and transmission.

SUMMARY OF THE INVENTION

Accordingly, the present invention has been made keeping in mind the above problems occurring in the prior art, and an object of the present invention is to provide a data storage communication apparatus and a data management method for the apparatus, in which a massive storage device is mounted within a wireless router, thereby reducing the frequency of use of lines within a network and rapidly supplying data, and in which the data of the massive storage device is efficiently distributed/re-distributed/deleted via the wireless router, thereby improving the storage efficiency of the storage device and being able to rapidly deal with a data request area later.

In order to accomplish the above object, the present invention provides a data storage communication apparatus, including a data request signal reception unit for receiving a data request signal from one of a plurality of user terminals; a main control unit for analyzing the data request signal received by the data request signal reception unit, and determining whether data is present in the apparatus itself by searching the apparatus; massive storage for storing and managing a variety of types of data found by the main control unit; and a data transmission unit for transmitting the data to the user terminal, the data being found in the storage by the main control unit.

Furthermore, in order to accomplish the above object, the present invention provides a method of transmitting data in conjunction with a plurality of user terminals, a data storage server, a data storage communication apparatus, one or more within-one-hop data storage communication apparatuses, and one or more within-two-hops data storage communication apparatuses, the method including (a) receiving, by a data request signal reception unit of the data storage communication apparatus, a data request signal from one of the user terminals; (b) analyzing, by a main control unit of the data storage communication apparatus, the data request signal, and determining whether requested data is present in storage of the data storage communication apparatus by searching the storage; (c) if it is determined at step (b) that the requested data is present in the storage, transmitting, by a data transmission unit of the data storage communication apparatus, the requested data to the user terminal; and (d) if it is determined at step (b) that the requested data is not present in the storage, controlling, by the main control unit, an external data request unit of the data storage communication apparatus so that the external data request unit requests the data from an outside.

Moreover, in order to accomplish the above object, the present invention provides a method of managing data in conjunction with a plurality of user terminals, a data storage server, a data storage communication apparatus, one or more within-one-hop data storage communication apparatuses, and one or more within-two-hops data storage communication apparatuses, the method including (A) when a data request signal reception unit of the data storage communication apparatus receives data requests from the plurality of user terminals, arranging, by the main control unit, data stored in storage based on data request times and data request counts; (B) determining, by the main control unit, whether a corresponding data request time arranged at step (A) is earlier than a reference request time and a request count during a specific period is larger than a reference request count; (C) if it is determined at step (B) that the data request time is later than the reference request time and the request count during the specific period is larger than the reference request count, determining, by the main control unit, whether a request repetition count is smaller than a maximum repetition count; (D) if it is determined at step (C) that the request repetition count is smaller than the maximum repetition count, distributing, by the main control unit, corresponding data to the within-one-hop data storage communication apparatuses and preserving, by the main control unit, the data; and (E) if it is determined at step (C) that the request repetition count is equal to or larger than the maximum repetition count, deleting, by the main control unit, corresponding data.

BRIEF DESCRIPTION OF THE DRAWINGS

The above and other objects, features and advantages of the present invention will be more clearly understood from the following detailed description taken in conjunction with the accompanying drawings, in which:

FIG. 4 is a diagram showing the structure of a database table which is used for a data management method using the data storage communication apparatus according to the present invention.

DESCRIPTION OF THE PREFERRED EMBODIMENTS

Embodiments of the present invention will be described in detail below with reference to the accompanying drawings. Herein, terms or words used in the present specification and claims should not be limitedly interpreted as common or dictionary meanings, and should be interpreted as meanings and concepts which accord with the technical spirit of the invention based on the principle that an inventor may appropriately define the concepts of terms and words in order to describe his/her invention the best way.

Accordingly, since the configurations illustrated in the present specification and the drawings are merely preferred embodiments of the present invention and are not representative of the overall technical spirit of the present invention, it should be appreciated that there may be a variety of equivalents and variations which can replace the above embodiments or the elements thereof at the time when this application is filed.

Figure 1:
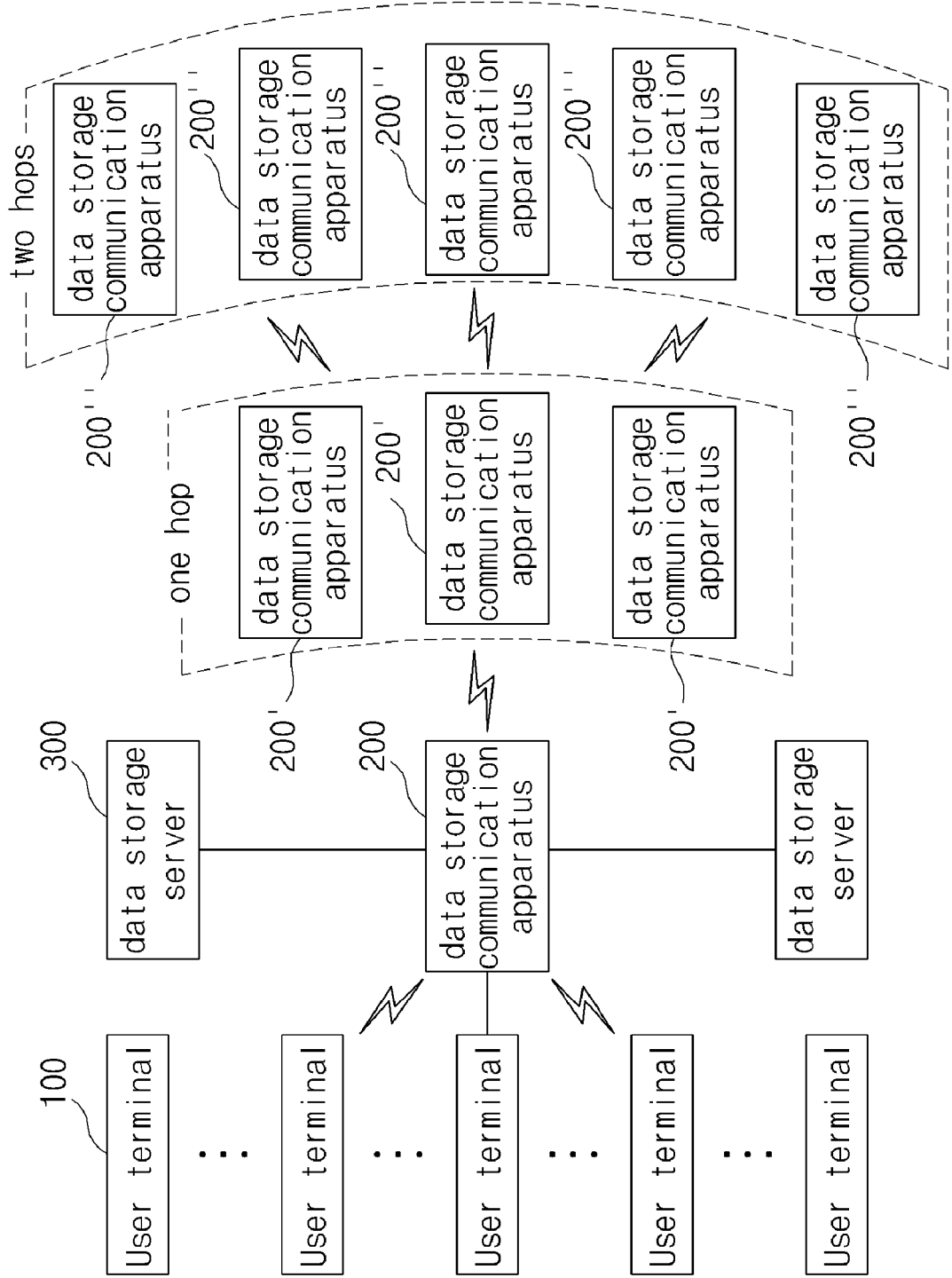
FIG. 1 is a block diagram of a data transmission system including a data storage communication apparatus according to the present invention.

FIG. 1 is a block diagram of a data transmission system including a data storage communication apparatus according to the present invention.

As shown in FIG. 1, the data transmission system includes a plurality of user terminals 100, a data storage communication apparatus 200, a data storage server 300, data storage communication apparatuses 200' within one hop, and data storage communication apparatuses 200" within two hops.

Figure 2:
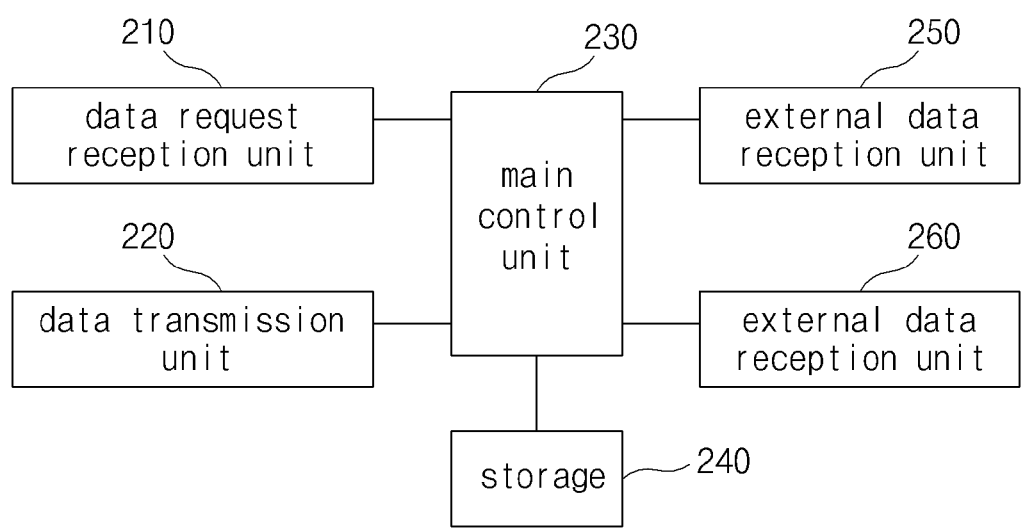
FIG. 2 is a block diagram of the data storage communication apparatus according to the present invention.

The data storage communication apparatus 200 according to the present invention, as shown in FIG. 2, includes a data request reception unit 210, a data transmission unit 220, a main control unit 230, storage 240, an external data request unit 250, and an external data reception unit 260.

For reference, the data storage communication apparatus 200 corresponds to a router or an access point (AP) device which extracts the location of a packet, designates the best path to the location, and directs a data packet to a subsequent device along the path.

The data request reception unit 210 receives a data request signal from one of the user terminals 100.

The main control unit 230 analyzes the data request signal received by the data request reception unit 210, and searches for data, requested by a user, in the storage 240 which stores a massive amount of data and corresponds to a Solid State Drive (SSD), a Hard Disk Drive (HDD), an SD card, Universal Serial Bus (USB) memory, or the like.

The data transmission unit 220 transmits the requested data, found in the main control unit 240, to the user terminal 100.

Meanwhile, when the main control unit 230 has searched the storage 240 and did not find the data requested by the user, the main control unit 230 controls the external data request unit 250 so that the main control unit 230 receives data from an external device connected over a wired network and transmits the data to the user terminal 100, or so that the main control unit 230 causes another external device connected over a wireless network to directly transmit the data to the user terminal 100.

That is, when the external data request unit 250 requests data from the external data storage server 300 connected over a wired network and the external data reception unit 260 receives the requested data, the main control unit 230 stores the received data in the storage 240 and, at the same time, performs control so that the data transmission unit 220 can transmit the data to the user terminal 100.

Meanwhile, when the external data request unit 250 requests data absent in the storage 240 from another data storage communication apparatus 200' or 200" connected over a wireless network within one hop or two hops, the data storage communication apparatus 200' or 200" is made to transmit the data directly to the user terminal 100.

A data management method for the data storage communication apparatus configured as described above according to another embodiment will be described below with reference to FIG. 3.

Figure 3:
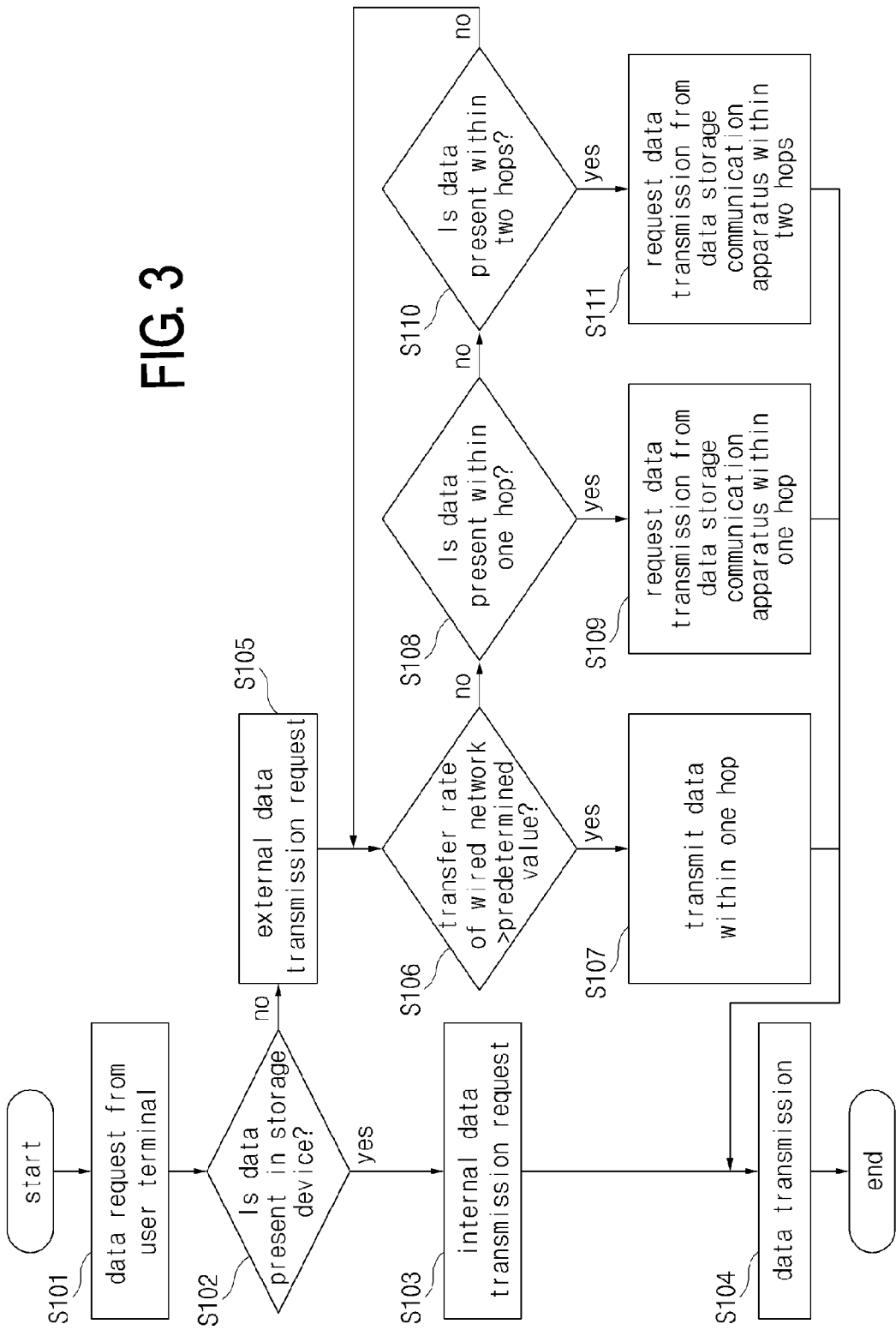
FIG. 3 is a flowchart illustrating a data transmission method using the data storage communication apparatus according to the present invention.

FIG. 3 is a flowchart illustrating a data transmission method using the data storage communication apparatus according to the present invention.

First, the data request reception unit 210 of the data storage communication apparatus 200 performs step S101 of receiving a data request signal from one of the user terminals 100.

The main control unit 230 performs step S102 of analyzing the data request signal received by the data request reception unit 210, searching for the requested data in the storage 240, and determining whether the requested data is present in the storage 240.

If the requested data is found at step S102 because it was stored in the storage 240, the main control unit 230 performs step S103 of requesting the internal data transmission of the found data to the user terminal 100 via the data transmission unit 220.

The data transmission unit 220 performs step S104 of transmitting the data found in the storage 240 to the user terminal 100.

If the requested data is not found at step S102 because it was not stored in the storage 240, the main control unit 230 performs step S105 of requesting the data from the outside via the external data request unit 250.

At step S105, the external data transmission request is made using the data storage server 300 connected over a wired network, the data storage communication apparatuses 200' within one hop, or the data storage communication apparatuses 200" within two hops.

For reference, the terms "one hop" and "two hops" refer to ranges which are determined based on the distances from the data storage communication apparatus to other data storage communication apparatuses. For example, another data storage communication apparatus which is located within a range of 5 m from the data storage communication apparatus may be defined as being within one hop, and still another data storage communication apparatus which is located within a range of 10 m may be defined as being within two hops.

More specifically, the data storage communication apparatus 200 performs step S106 of determining whether the transfer rate of a wired network is higher than a predefined rate by checking the transfer rate of the wired network and determining whether it satisfies the predefined minimum wired network transfer rate (for example, 20 Mbps).

If it is determined at step S106 that the transfer rate of the wired network is higher than the predefined rate, the external data request unit 250 performs step S107 of requesting data from the data storage server 300 connected over a wired network.

When the requested data is received at step S107, the main control unit 230 performs step S104 of storing the received data in the storage 240 and causing the data to be transmitted to the user terminal 100 via the data transmission unit 220.

Meanwhile, if the transfer rate of the wired network is equal to or lower than the predefined rate at step S106, the data storage communication apparatus 200 performs step S108 of determining whether the data storage communication apparatuses 200' located within one hop have the data.

If it is determined at step S108 that the data storage communication apparatuses 200' located within one hop have the data, the external data request unit 250 performs step S109 of requesting the storage communication apparatuses 200' within one hop to directly transmit the data to the user terminal 100.

If it is determined at step S108 that the data storage communication apparatuses 200' located within one hop do not have the data, the data storage communication apparatus 200 performs step S110 of determining whether the data storage communication apparatuses 200" located within two hops have the data.

If it is determined at step S110 that the data storage communication apparatuses 200" located within two hops have the data, the external data request unit 250 performs step S111 of requesting the data storage communication apparatuses 200" located within two hops to directly transmit the data to the user terminal 100.

If it is determined at step S110 that no data storage communication apparatus 200" located within two hops has the data, the data storage communication apparatus 200 again performs step S106 of determining whether the transfer rate of the wired network is higher than a predefined rate by checking the transfer rate of the wired network and determining whether it satisfies a predefined minimum wired network transfer rate (for example, 20 Mbps) and its subsequent steps.

Meanwhile, the storage 240 stores data in the form of a database table, as shown in FIG. 4.

That is, the data table which is stored by the storage 240 includes a content list, a content size list, a virtual code list, a recent request time list, a request count list, a within-one-hop data storage communication apparatus list, a within-two-hops data storage communication apparatus list, and a ranking list.

The content list is a list of pieces of content which the data storage communication apparatus 200 has, the content size list is a list of the sizes of content files, and the virtual code list is a list of virtual codes which have been allocated to respective pieces of content. Since such a virtual code is periodically provided, another data storage communication apparatus 200 may perform communication using only a virtual code allocated to specific content.

Meanwhile, the recent request time list and the request count list are updated whenever a data transmission request is received from the user.

Furthermore, the within-one-hop data storage communication apparatus list and the within-two-hops data communication apparatus list are managed by periodic message exchange.

Furthermore, the storage 240 calculates scores using the following Equation 1 in order to determine whether to continue to store stored data:

$$\text{score}(t+1) = (1-\rho)\text{score}(t) * Fe^{-k(size-M)^2} + \Delta\text{request}(t) \quad (1)$$

That is, the storage 240 calculates scores for respective pieces of data using Equation 1, arranges the scores in descending order, and deletes pieces of data which do not satisfy the minimum request time and the minimum request count and which have ranks below a specific rank.

In Equation 1, score(t+1) is a score at time (t+1), score(t) is a score at time t, $\rho$ is the rate of decrease in the score over time, F is a weight for a data file size, k is sensitivity to the data file size, size is the data file size, M is a reference size for the data file size, and Δrequest is a score weight when a file is requested.

It is assumed that all the events which had occurred between time (t+1) and time t are events which occurred at time t.

Data with a later recent request time may be given a higher score by means of the rate of decrease of the score over time.

Meanwhile, the influence of the size of a data file is incorporated into a score based on a Gaussian function. When the size of a data file is smaller than a specific file size M (for example, 2 GM), the influence on a score is proportional to the size of the data file. When the size of a data file is equal to or larger than the specific file size M (for example, 2 GM), the influence on a score is inversely proportional to the size of the data file.

Furthermore, Δrequest increases the score whenever a data file request occurs.

A data management method using the data storage communication apparatus according to the present invention will be described below with reference to FIG. 5.

Figure 5:
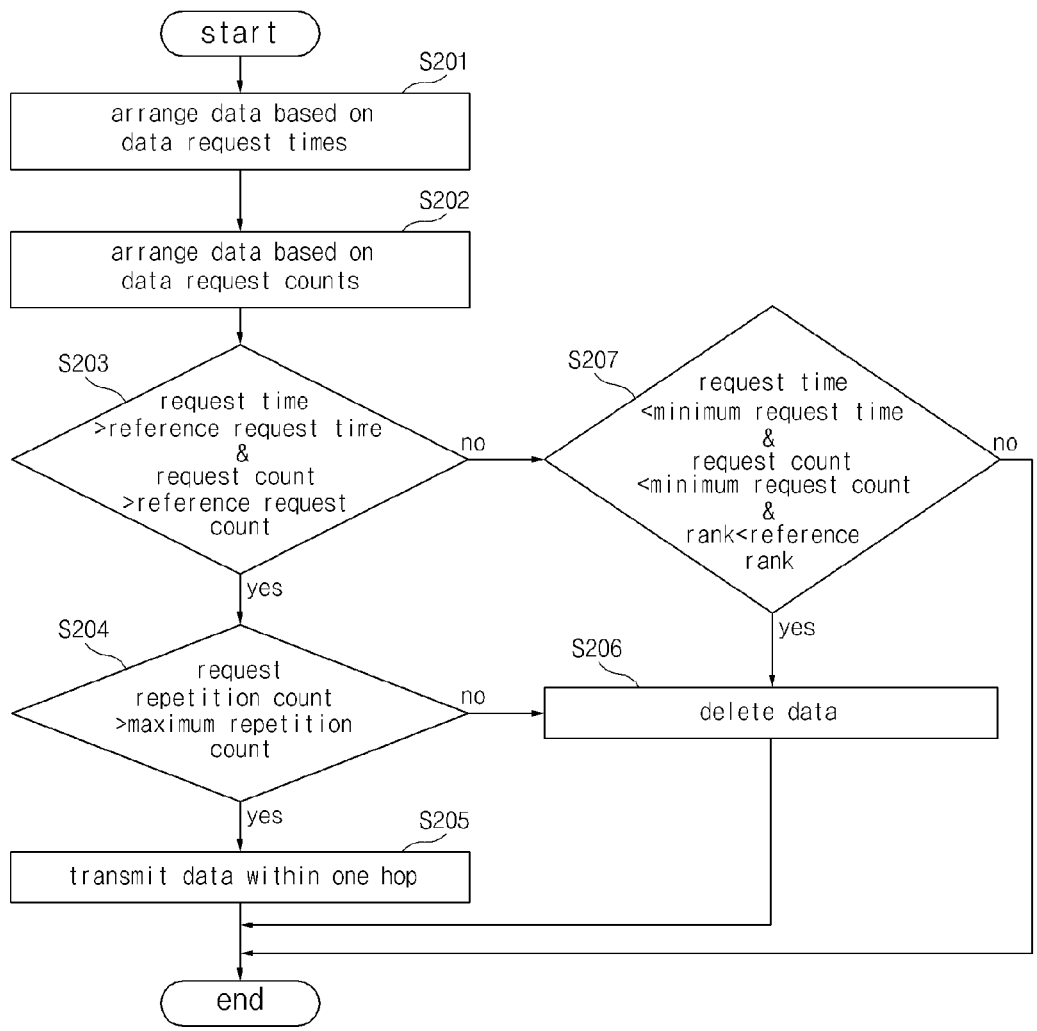
FIG. 5 is a diagram showing the algorithm of the data management method using the data storage communication apparatus according to the present invention.

FIG. 5 is a diagram showing the algorithm of the data management method using the data storage communication apparatus according to the present invention.

As shown in FIG. 5, when the data request signal reception unit 210 of the data storage communication apparatus according to the present invention receives data requests from a plurality of user terminals 100, the main control unit 230 performs step S201 of arranging data stored in the storage 240 based on the times at which the data was requested.

Furthermore, the main control unit 230 performs step S202 of arranging the data stored in the storage 240 based on the numbers of times the data has been requested.

In order to distinguish between data to be distributed and data to be deleted on the basis of the repeated performance of steps S201 and S202, the main control unit 230 performs step S203 of determining whether a data request time is later than a reference request time (for example, one week ago) and a request count during a specific period (for example, three hours) is larger than a reference request count (for example, 20).

If it is determined at step S203 that the data request time is later than the reference request time and the request count during the specific period is larger than the reference request count, the main control unit 230 performs step S204 of determining whether a request repetition count is smaller than the maximum repetition count (for example, 300). If the request repetition count is smaller than the maximum repetition count, the main control unit 230 performs step S205 of distributing data to other data storage communication apparatuses 200' present within one hop.

At step S205, the main control unit 230 further performs the step of re-distributing data from the within-one-hop data storage communication apparatuses 200' to the within-two-hops data storage communication apparatuses 200".

If it is determined at step S204 that the request repetition count is equal to or greater than the maximum repetition count (for example, 300), the main control unit 230 performs step S206 of determining that corresponding data is somewhat useless data and deleting the data.

If it is determined at step S203 that the data request time is not earlier than the reference request time and the request count during a specific period is not larger than the reference request count, the main control unit 230 performs step S207 of determining whether the data request time is earlier than the latest request time (for example, one month ago), whether the request count is smaller than the minimum request count (for example, 3), and whether the rank based on the score is lower than the reference rank (for example, the 20th rank), and, if the data request time is earlier than the latest request time, the request count is smaller than the minimum request count, and the rank based on the score is lower than the reference rank, performs step S206 of deleting corresponding data.

Meanwhile, if, as a result of the determination, it is determined at step S207 that the data request time is equal to or later than the latest request time, the request count is equal to or larger than the minimum request count, or the rank based on the score is equal to or higher than the reference rank, the main control unit 230 preserves corresponding data.

The data storage communication apparatus and the data management method for the apparatus according to the present invention have the advantages of facilitating the installation of devices and also ensuring portability because the massive storage device is mounted within the wireless router, and have the advantages of increasing the processing speed of data supply and also improving the performance of the overall network because the storage device is disposed on an internal board, rather than being placed outside the apparatus and being connected to the apparatus, so that the data transfer rate can be improved and the frequency of transmission of data using the overall wireless network can be reduced.

Furthermore, the data storage communication apparatus and the data management method for the apparatus according to the present invention have the advantages of rapidly supplying data in response to requests because the data of the massive storage device can be efficiently distributed/redistributed/deleted via the wireless router, so that data having a high possibility of being used is chiefly stored in the storage device and content is acquired prior to the user's requests.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A data storage communication apparatus, comprising a processor configured to implement:
   a data request signal reception unit for receiving a data request signal from one of a plurality of user terminals;
   a main control unit for analyzing the data request signal received by the data request signal reception unit, and determining whether data is present in the data storage communication apparatus itself by searching the data storage communication apparatus;
   mass storage for storing and managing a variety of types of data found by the main control unit; and
   a data transmission unit for transmitting the data to the user terminal;
   wherein the data storage communication apparatus is configured to, in response to the data request signal, if it is determined by the main control unit that the data is not present in the mass storage, perform an external data request for data of an external device, the external data request including:
   determining whether a transfer rate of a wired network is higher than a predetermined rate by checking the transfer rate of the wired network and determining whether the transfer rate of the wired network satisfies a set minimum transfer rate of a wired network, if the data storage communication apparatus determines that the transfer rate of the wired network is higher than the predetermined rate, requesting the data from the external device, and if the data storage communication apparatus determines that the transfer rate of the wired network is equal to or lower than the predetermined rate, determining whether another data storage communication apparatus within one hop of the data storage communication apparatus has the data and requesting the data from the other data storage communication apparatus when the other data storage communication apparatus has the data.

2. The data storage communication apparatus of claim 1, further comprising an external data request unit for performing the external data request.

3. The data storage communication apparatus of claim 2, wherein the external device from which the external data request unit requests the data is a data storage server connected over a wired network, one or more data storage communication apparatuses connected over a wireless network within one hop, or one or more other data storage communication apparatuses within two hops.

4. The data storage communication apparatus of claim 3, wherein the main control unit transfers the requested data to the data transmission unit and also stores the requested data in the mass storage, the requested data being received from the data storage server connected to an external data reception unit over a wired network.

5. A method of transmitting data in conjunction with a plurality of user terminals, a data storage server, a data storage communication apparatus, one or more data storage communication apparatuses within one hop of the data storage communication apparatus, and one or more data storage communication apparatuses within two hops of the data storage communication apparatus, the method comprising:

(a) receiving, by a data request signal reception unit of the data storage communication apparatus, a data request signal from one of the user terminals;

(b) analyzing, by a main control unit of the data storage communication apparatus, the data request signal, and determining whether requested data is present in storage of the data storage communication apparatus by searching the storage; and (c) if it is determined at step (b) that the requested data is present in the storage, transmitting, by a data transmission unit of the data storage communication apparatus, the requested data to the user terminal; or (d) if it is determined at step (b) that the requested data is not present in the storage, controlling, by the main control unit, an external data request unit of the data storage communication apparatus so that the external data request unit issues a request for the data from outside the data storage communication apparatus;

(d-1) in response to determining that the requested data is not present in the storage, determining, by the data storage communication apparatus, whether a transfer rate to a data storage server via a wired network is higher than a predetermined rate by checking the transfer rate via the wired network and determining whether the transfer rate via the wired network satisfies a set minimum transfer rate of a wired network; and (d-2) if it is determined at step (d-1) that the transfer rate via the wired network is higher than the predetermined rate, requesting, by the external data request unit, the data from the data storage server; or (d-1-1) if it is determined at step (d-1) that the transfer rate via the wired network is equal to or lower than the predetermined rate, determining, by the data storage communication apparatus, whether the one or more of the data storage communication apparatuses within one hop have the data, and requesting the data from at least one of the one or more of the data storage communication apparatuses within one hop when the one or more of the data storage apparatuses within one hop have the data.

6. The method of claim 5, wherein step (d) comprises:

(d-3) when an external data reception unit of the data storage communication apparatus receives the data requested at step (d-2), storing, by the main control unit, the received data in the storage and also performing, by the main control unit, control so that the received data is transmitted to the user terminal via the data transmission unit.

7. The method of claim 6, further comprising:

(d-1-2) if it is determined at step (d-1-1) that the one or more of the data storage communication apparatuses within one hop have the data, requesting, by the external data request unit, the data from the one or more of the data storage communication apparatuses within one hop to transmit the data to the user terminal.

8. The method of claim 7, further comprising:

(d-1-1-1) if it is determined at step (d-1-1) that the one or more data storage communication apparatuses within one hop do not have the data, determining, by the external data request unit, whether the one or more data storage communication apparatuses within two hops have the data; and (d-1-1-2) if it is determined at step (d-1-1-1) that the one or more data storage communication apparatuses within two hops have the data, requesting, by the external data request unit, the one or more data storage communication apparatuses within two hops to transmit the data to the user terminal.

9. The method of claim 8, further comprising:

if it is determined at step (d-1-1-1) that the data storage communication apparatuses within two hops do not have the data, repeating at least step (d-1).

10. A method of managing data in conjunction with a plurality of user terminals, a data storage server, a data storage communication apparatus, one or more within-one-hop data storage communication apparatuses, and one or more within-two-hops data storage communication apparatuses, the method comprising:

(A) when a data request signal reception unit of the data storage communication apparatus receives data requests from the plurality of user terminals, arranging, by the main control unit, data stored in storage based on data request times and data request counts;

(B) determining, by the main control unit, whether a corresponding data request time arranged at step (A) is earlier than a reference request time and a request count during a specific period is larger than a reference request count;

(C) if it is determined at step (B) that the data request time is later than the reference request time and the request count during the specific period is larger than the reference request count, determining, by the main control unit, whether a request repetition count corresponding to a request for same data is smaller than a maximum repetition count;

(D) if it is determined at step (C) that the request repetition count is smaller than the maximum repetition count, distributing, by the main control unit, corresponding data to the within-one-hop data storage communication apparatuses and preserving, by the main control unit, the same data; and (E) if it is determined at step (C) that the request repetition count is equal to or larger than the maximum repetition count, deleting, by the main control unit, corresponding same data.

11. The method of claim 10, further comprising:

(B-1) if it is determined at step (B) that the corresponding data request time arranged at step (A) is not later than the reference request time and the request count during the specific period is not larger than the reference request count, determining, by the main control unit, whether the data request time is earlier than a minimum request time, the request count is smaller than a minimum request count, and a rank based on a score is lower than a reference rank, and if the data request time is earlier than the minimum request time, the request count is smaller than the minimum request count and the rank based on the score is lower than the reference rank, deleting, by the main control unit, corresponding data.

12. The method of claim 11, further comprising:

if it is determined at step (B-1) that the data request time is equal to or later than the maximum request time, the request count is equal to or larger than the minimum request count, and the rank based on the score is equal to or higher than the reference rank, performing step (E) of deleting, by the main control unit, corresponding data.

13. The method of claim 11, wherein the score is calculated using the following equation:

$$\text{score}(t+1)=(1-\rho)\text{score}(t)*Fe^{-k(size-M)^2}+\Delta\text{request}(t)$$

where score (t+1) is a score at time (t+1), score(t) is a score at time t, $\rho$ is a rate of decrease in score over time, F is a weight for data file size, k is sensitivity to the data file size, size is the data file size, M is a reference size for the data file size, and $\Delta$request is a score weight when a file is requested.

14. The method of claim 10, wherein step (D) comprises requesting, by the main control unit, re-distribution of data from the within-one-hop data storage communication apparatuses to the within-two-hops data storage communication apparatuses.

15. The method of claim 11, wherein the score is calculated using the following equation:

$$\text{score}(t+1)=(1-\rho)\text{score}(t)*Fe^{-k(size-M)^2}+\Delta\text{request}(t)$$

where score (t+1) is a score at time (t+1), score(t) is a score at time t, $\rho$ is a rate of decrease in score over time, F is a weight for data file size, k is sensitivity to the data file size, size is the data file size, M is a reference size for the data file size, and $\Delta$request is a score weight when a file is requested.

16. The method of claim 12, wherein the score is calculated using the following equation:

$$\text{score}(t+1)=(1-\rho)\text{score}(t)*Fe^{-k(size-M)^2}+\Delta\text{request}(t)$$

where score (t+1) is a score at time (t+1), score(t) is a score at time t, $\rho$ is a rate of decrease in score over time, F is a weight for data file size, k is sensitivity to the data file size, size is the data file size, M is a reference size for the data file size, and $\Delta$request is a score weight when a file is requested.

17. The method of claim 11, further comprising:

if the data request time is equal to or later than a latest request time, the request count is equal to or larger than the minimum request count, or the rank based on the score is equal to or higher than the reference rank, preserving the corresponding data.

* * * * *